(12) United States Patent
Utsunomiya et al.

(10) Patent No.: US 7,282,635 B2
(45) Date of Patent: Oct. 16, 2007

(54) TERMINAL BOX

(75) Inventors: Keiichiro Utsunomiya, Tokyo (JP); Takeshi Takada, Tokyo (JP); Naoki Ito, Tokyo (JP); Masayoshi Suzuki, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 874 days.

(21) Appl. No.: 10/735,743

(22) Filed: Dec. 16, 2003

(65) Prior Publication Data

US 2004/0261835 A1    Dec. 30, 2004

(30) Foreign Application Priority Data

Jun. 27, 2003   (JP) .............................. 2003-184776

(51) Int. Cl.
*H01L 31/042*    (2006.01)
(52) U.S. Cl. ...................... 136/244; 136/243
(58) Field of Classification Search ........ 136/243–265; 361/679–821
See application file for complete search history.

(56) References Cited

FOREIGN PATENT DOCUMENTS

| JP | 2001077391 | * | 3/2001 |
|---|---|---|---|
| JP | 2001-168368 | | 6/2001 |
| JP | 2001168368 | * | 6/2001 |
| JP | 2002111032 | * | 4/2002 |

* cited by examiner

Primary Examiner—Nam Nguyen
Assistant Examiner—Jeffrey Barton
(74) Attorney, Agent, or Firm—Buchanan Ingersoll & Rooney PC

(57) ABSTRACT

A solar battery module can be constituted without connecting a plurality of bypass diodes, increasing the volume of potting, or reducing the area of a solar battery cell, so that the problems such as an increase in size of a terminal box, an increase in fabrication cost or a drop in mass productivity are overcome. A terminal box constituting an output section of a solar battery module, includes: a box body housing a circuit constituting section constituted by terminal boards, a bypass diode, and the like; and a box cover having a double structure of an inner cover made of a metal material and an outer cover made of a weather-resistant resin. The box body has an open side opposite to its attachment face, and includes a portion housing a charging section of the circuit constituting section apart from an outer wall structure of the box body. The box body is formed to have a box structure made of a weather-resistant resin. The open side of the box structure is covered with the box cover.

9 Claims, 6 Drawing Sheets

TERMINAL BOX

BACKGROUND OF THE INVENTION

1. Field of the Invention

The present invention relates to a terminal box constituting an output section of a solar battery module constituting a solar power generation system.

2. Description of the Related Art

In a terminal box constituting an output section of a solar battery module, a circuit constituting section constituted by a terminal board, a bypass diode, an output cable, and the like is housed within a box body having one open side. The circuit constituting section is buried by filling a potting material, and the opening side of the box body is closed with a cover (for example, see the Publication No. 2001-168368 of unexamined application, illustrated in FIG. 1).

In the above-described conventional terminal box for solar battery module, the circuit constituting section is potted with a silicon resin excellent in thermal conductivity. Thus, the heat generated from the bypass diode and the like is dissipated through the potting material. The potting material fills the terminal box, covering the surface of a charging section and the inner walls of the box body of the terminal box so as not to leave any gap. Although the potting material serves to prevent the breaking or breakage of the bypass diode owing to its heat dissipation effects, the penetration of water or moisture to the charging section, and the adhesion of any dust, the potting material is sometimes thermally deformed due to heat generated from the circuit constituting section. The thermal deformation of the potting material leads to deformation of the box body or the cover, whereby the capability of the potting material of preventing water or moisture from entering the charging section may sometimes be impaired. In order to prevent such a problem, the following means have been conventionally employed. A plurality of bypass diodes are connected in series and in parallel so as to reduce the amount of heat generation by each bypass diode. Alternatively, the surface area or the volume of the potting material or the terminal board is increased so as to enhance the heat dissipation efficiency. Further alternatively, the area of a solar battery cell is reduced to decrease the amount of heat generated by the bypass diode. However, the use of these means disadvantageously induces an increase in size of the terminal box, an increase in fabrication cost, or a drop in mass productivity.

SUMMARY OF THE INVENTION

In view of the above-described conventional problem, the present invention has an object of providing a terminal box used for a solar battery module, which is scarcely thermally deformed by heat generated from a circuit constituting section, with reduction in fabrication cost of the solar battery module and without any impairment of the mass productivity.

In order to achieve the above object, a terminal box of the present invention, constituting an output section of a solar battery module, includes: a box body housing a circuit constituting section including at least a terminal board and a bypass diode, with an open side opposite to its attachment face, the box body including a portion for housing a charging section of the circuit constituting section and being formed to have a box structure made of a weather-resistant resin, the portion being apart from an outer wall; and a box cover having a double structure of an inner cover made of a metal material and an outer cover made of a weather-resistant resin, the box cover covering the open side of the box structure.

By employing the above means, even if heat is generated from the charging section of the circuit constituting section, since the charging section is apart from the outer wall of the box body, the outer shell of the box body is hardly thermally deformed. In addition, since the box cover has a double structure of the inner cover made of a metal material and an outer cover made of a weather-resistant resin, the box cover is hardly thermally deformed. Therefore, the terminal box according to the present invention has good water resistance and dust immunity as the terminal box.

DETAILED DESCRIPTION OF THE PREFERRED EMBODIMENTS

First Embodiment

Figure 1:
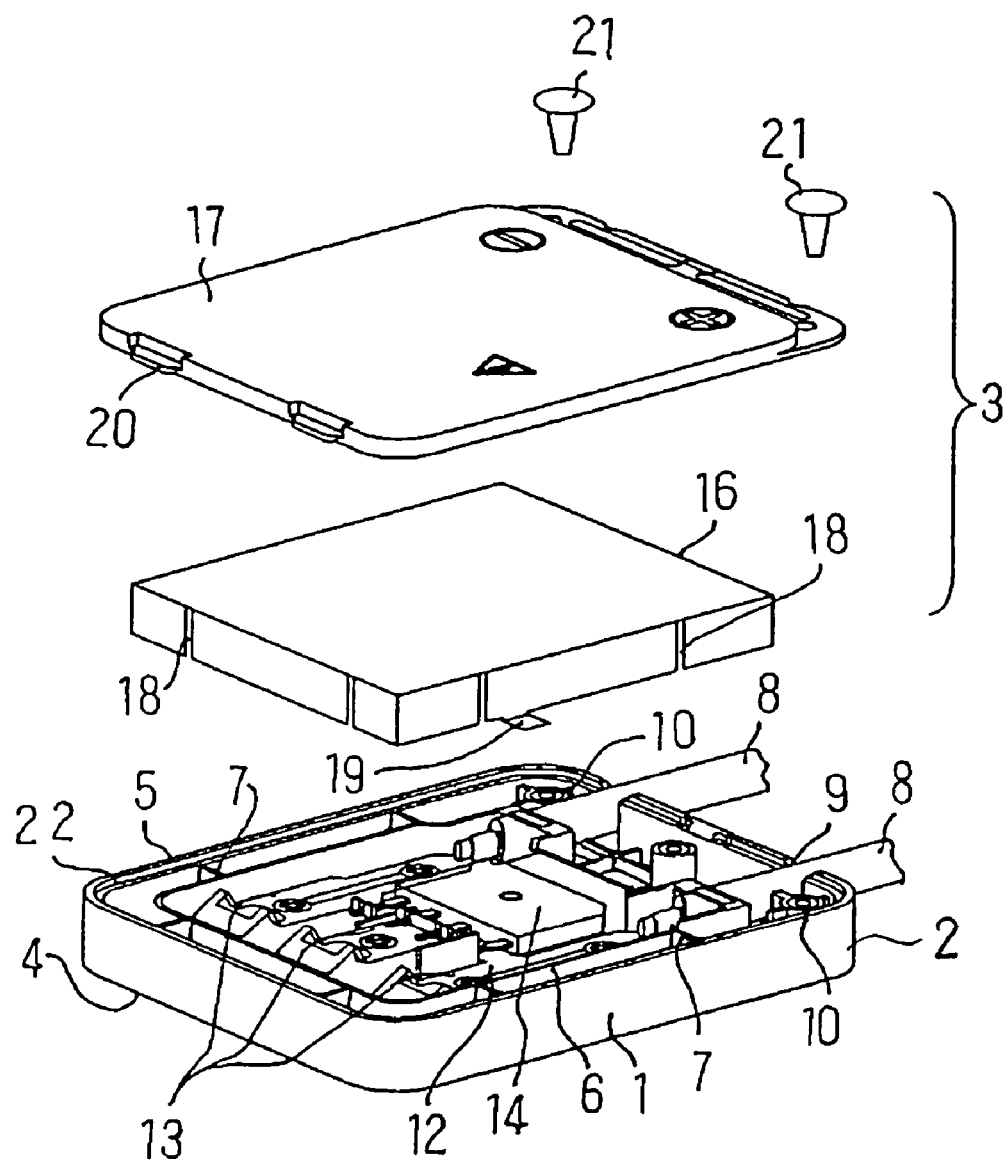
FIG. 1 is an exploded perspective view showing a terminal box according to a first embodiment of the present invention prior to potting.
Figure 2:
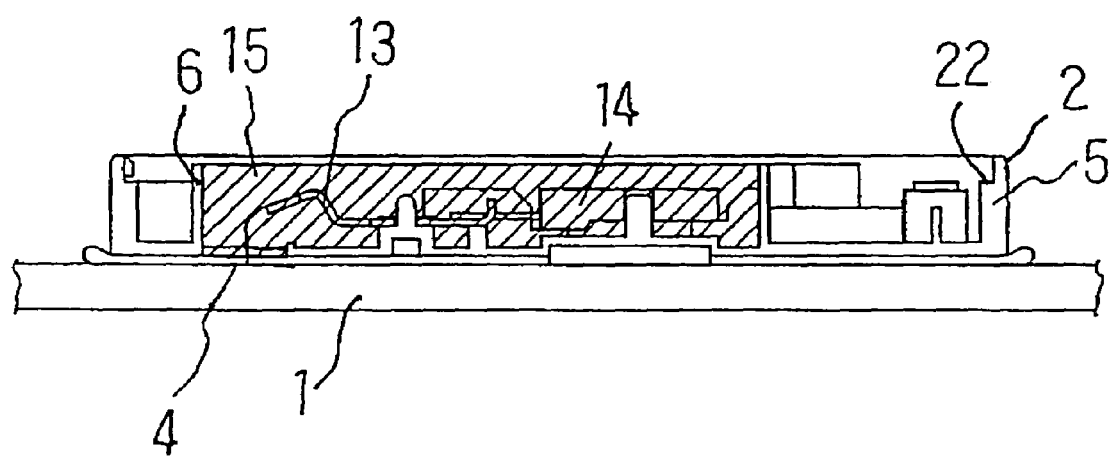
FIG. 2 is a longitudinal sectional view showing the terminal box according to the first embodiment of the present invention with a box cover being removed.
Figure 3:
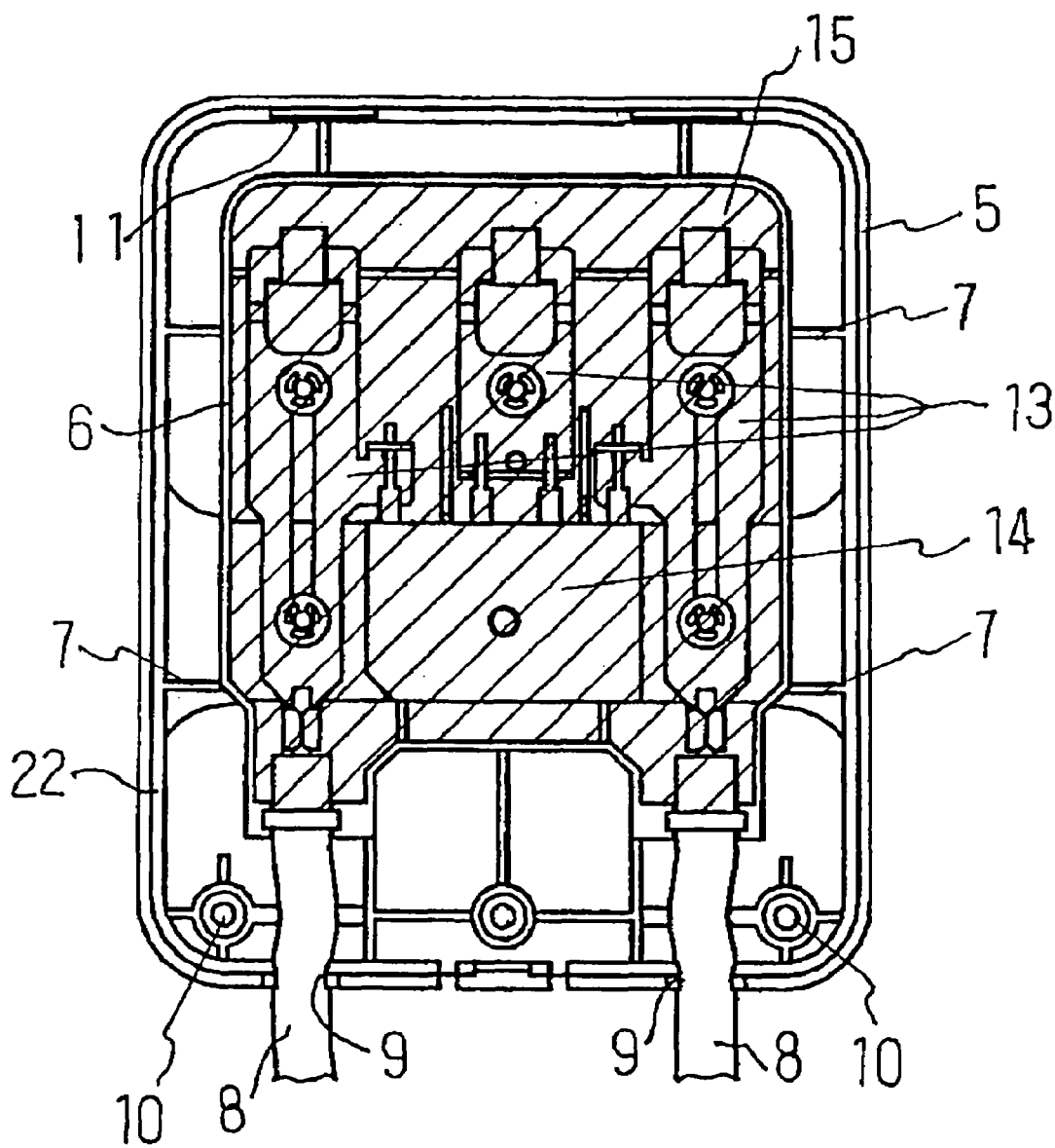
FIG. 3 is a plan view showing the terminal box according to the first embodiment of the present invention with the box cover being removed.
Figure 4:
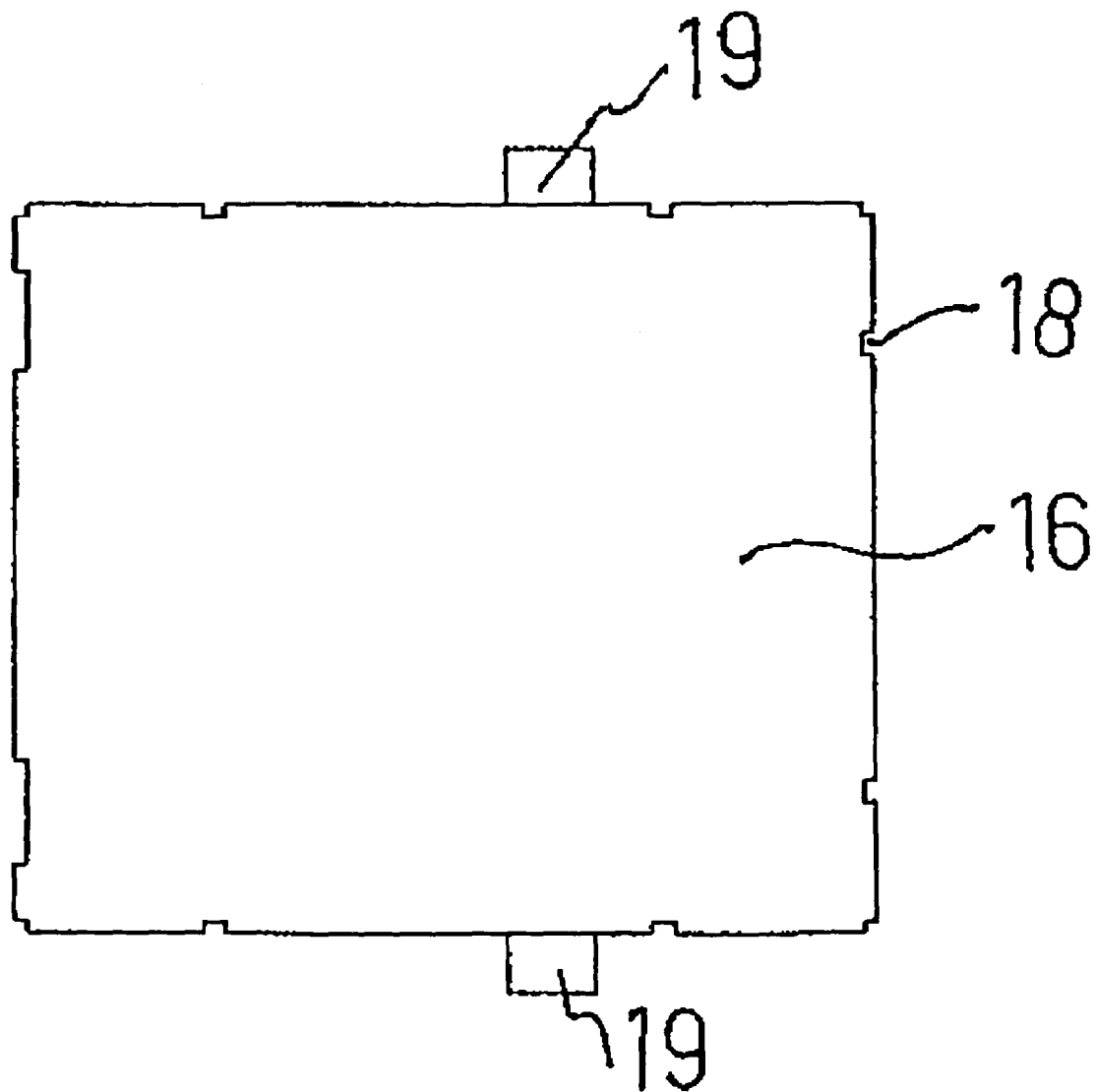
FIG. 4 is a plan view showing an inner cover of the terminal box according to the first embodiment of the present invention.

FIG. 1 is an exploded perspective view of a terminal box for a solar battery module before a charging section of a circuit constituting section is potted. FIG. 2 is a longitudinal sectional view showing the terminal box in its attached state with a box cover being removed. FIG. 3 is a plan view showing the terminal box with the box cover being removed. FIG. 4 is a plan view showing an inner cover of the box cover for the terminal box.

The terminal box constituting an output section of a solar battery module 1 according to this embodiment, illustrated in FIGS. 1 to 4, includes a box body 2 and a box cover 3. The box body 2 houses a circuit constituting section that is closely attached onto the bottom face of the solar battery module 1 by means such as adhesion, as shown in FIG. 2. The box body 2 is integrally formed of a resin excellent in fire resistance and weather resistance such as an ABS resin or a modified PPO resin so as to have a square box structure with an open side opposite to an attachment face 4.

A charging section housing portion 6 is formed in the box body 2 so as to leave some space from an outer wall structure 5 forming four edges of the box body 2. A height of the charging section housing portion 6 is formed so as to be lower than that of the outer wall structure 5. The charging section housing portion 6 and an inner wall of the outer wall structure 5 are connected with each other through a plurality of longitudinal and horizontal ribs 7. On the face of one shorter edge of the outer wall structure 5, two outlets 9 for output lead wires 8 are provided side by side. Bosses 10 are provided in a projecting manner inside the attachment face 4 in the vicinity of the outlets 9 so as to be apart from the outlets 9. A screw hole is provided at the center of each of the bosses 10. On the inner wall of the other shorter edge of the outer wall structure 5, two engaging concave portions 11 are provided at a distance. Holes, through which the output lead wires 8 pass, are provided in the charging section housing portion 6 at the positions corresponding to the respective outlets 9.

A charging section 12 for the circuit constituting section is housed within the charging section housing portion 6. The circuit constituting section is constituted by terminal boards 13, a bypass diode 14, and the output lead wires 8. The charging section 12 of the terminal boards 13, the bypass diode 14, and connecting portions between the output lead wires 8 and the terminal boards 13 is housed within the charging section housing portion 6. After the charging section 12 is housed within the charging section housing portion 6, the charging section housing portion 6 is filled with a filler 15 so as to completely cover the charging section 12. As the filler 15, two-part silicon potting material according to the V0 grade of the UL94 standard is suitable in terms of fire resistance, heat dissipation ability, and fillability.

After the filler 15 is cured, the box cover 3 is provided on the open side of the box body 2 so as to cover it. The box cover 3 has a double structure of an inner cover 16 and an outer cover 17. The inner cover 16 is formed of a stainless material or a steel plate having a thickness of about 0.5 mm. The outer cover 17 is formed of a resin excellent in fire resistance and weather resistance, such as an ABS resin or a modified PPO resin. The inner cover 16 has a box structure covering the outer circumference of the charging section housing portion 6 and the surface of the filler 15. Slits 18 are provided as fitting structures on the circumferential sides of the inner cover 16, into which the ribs 7 of the box body 2 are fitted. At the lower ends of the two circumferential sides, externally bent flanges 19 are provided as fitting structures. The end faces of the flanges 19 abut against the inner face of the outer wall structure 5 of the box body 2. The inner cover 16 is placed over the charging section housing portion 6 filled with the filler 15 so as to be facedown. The surface of the filler 15 and the inner face of the inner cover 16 are in close contact with each other. When the ribs 7 are fitted into the slits 18, and the flanges 19 abut against the inner face of the outer wall structure 5, the inner cover 16 is locked to be fixed onto the box body 2.

The outer cover 17 closes the open side of the box body 2 so as to cover the inner cover 16. Protrusions 20, which can be hooked on engaging concave portions 11 of the box body 2, are formed on one shorter edge of the outer cover 17. When the protrusions 20 are hooked on the engaging concave portions 11 and screws 21 are inserted through the screw insertion holes provided in a plane on the opposite side of the outer cover 17 so as to be tightened in the screw holes formed in the box body 2, the outer cover 17 is attached. The circumferential edge of the outer cover 17 is fitted into a step portion 22 provided for the outer structure 5 of the box body 2 so as to keep a water-proof state. The outer cover 17 and the inner cover 16 are not in close contact with each other so as to leave a gap of about 1 mm therebetween.

In this terminal box, since the gap is formed between the outer wall structure 5 of the box body 2 and the charging section housing portion 6 to insulate the heat therefrom even if the heat is generated from the charging section 12 such as the bypass diode 14, the outer wall structure 5 of the box body 2 is not thermally deformed. Moreover, since the box cover 3 has a double structure of the inner cover 16 made of a metal material and the outer cover 17 made of a fire-resistant resin, the box cover 3 is not virtually thermally deformed. Therefore, the solar battery module 1 can be constituted without connecting a plurality of the bypass diodes 14 in series and in parallel, increasing the surface area or the volume of the potting or the terminal board, or decreasing the area of the solar battery cell. Thus, the problems such as an increase in size of the terminal box, an increase in fabrication cost, and a drop in mass productivity can be overcome. Furthermore, the selection of a bypass diode is facilitated, and a diameter of the solar battery cell can be increased.

Furthermore, the heat generated from the charging section 12 is dissipated by the filler 15 excellent in heat dissipation ability so as to be further dissipated by the heat dissipation fin function of the inner cover 16 in contact with the filler 15. Since the gap is ensured between the outer cover 17 and the inner cover 16, the outer cover 17 is less affected by the heat. Since the inner cover 16 is present inside the outer cover 17 and is formed of a stainless plate or rustless steel plate, the terminal box can keep its function as a terminal box on a long-term basis in the environment where the terminal box is actually used. The double-structured box cover 3 and the inner cover 16 having a box structure allow the water resistance and the dust immunity of the charging section 12 to be ensured on a long-term basis.

Second Embodiment

Figure 5:
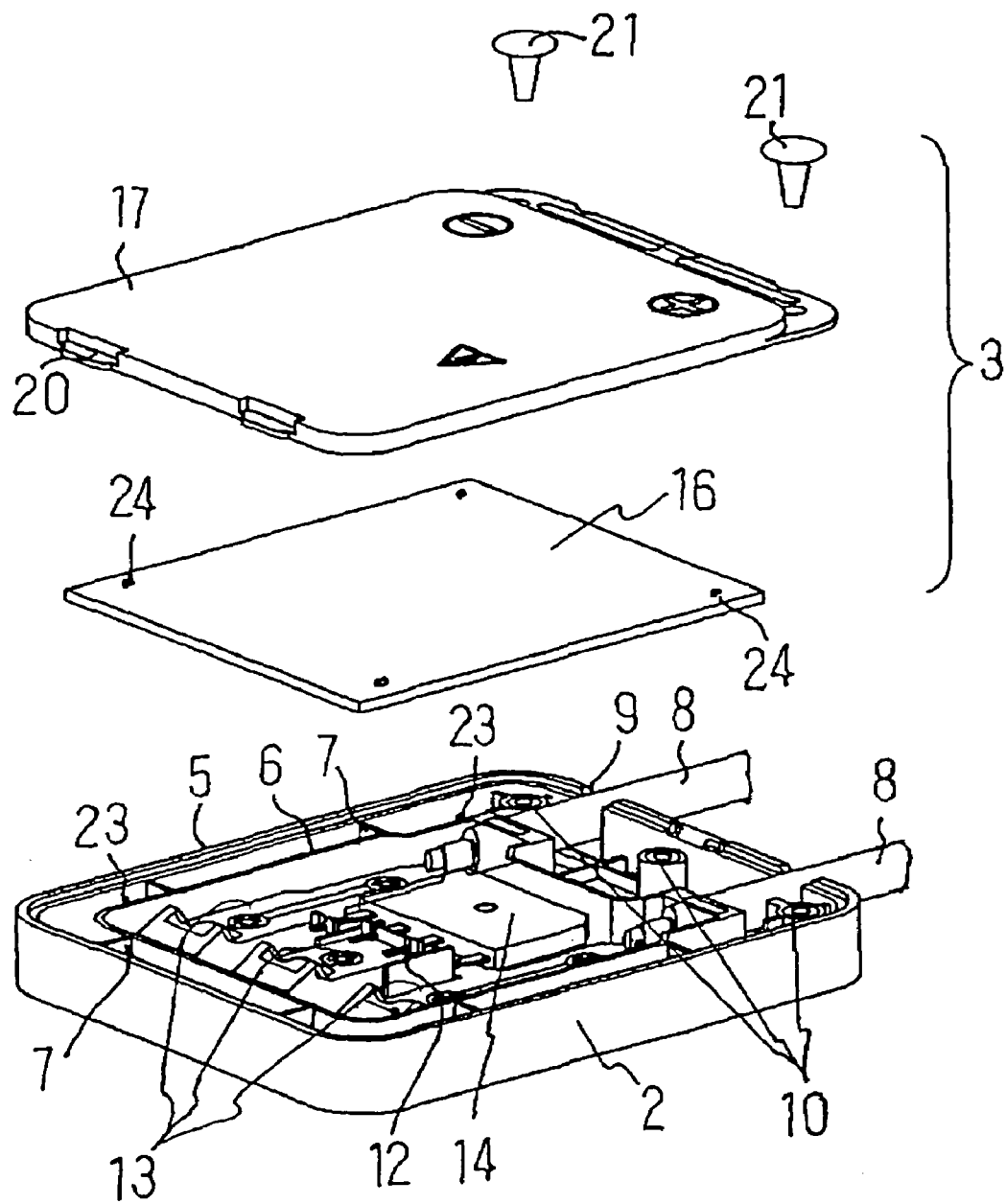
FIG. 5 is an exploded perspective view showing a terminal box according to a second embodiment of the present invention prior to potting.

In the second embodiment shown in FIG. 5, the inner cover 16 of the terminal box described in the first embodiment is constituted by a flat plate. The other structure is the same as that in the first embodiment. Therefore, the same components in this embodiment as those in the first embodiment are denoted by the same reference numerals, and the description thereof is herein omitted.

In the terminal box in this embodiment, the inner cover 16 of the box cover 3 is constituted by a metal flat plate. At the top of the charging section housing portion 6 of the box body 2, a plurality of small protrusions 23 are formed. The small protrusions 23 are fitted into small holes 24 formed in the flat plate inner cover 16. The resistance to thermal deformation and the water-proof function of the terminal box body with such a structure are slightly inferior to those of the terminal box with the inner cover 16 having a box structure. However, the structure is simple enough to allow easy fabrication, thereby also reducing the fabrication cost. The other functions are the same as those in the first embodiment.

Third Embodiment

Figure 6:
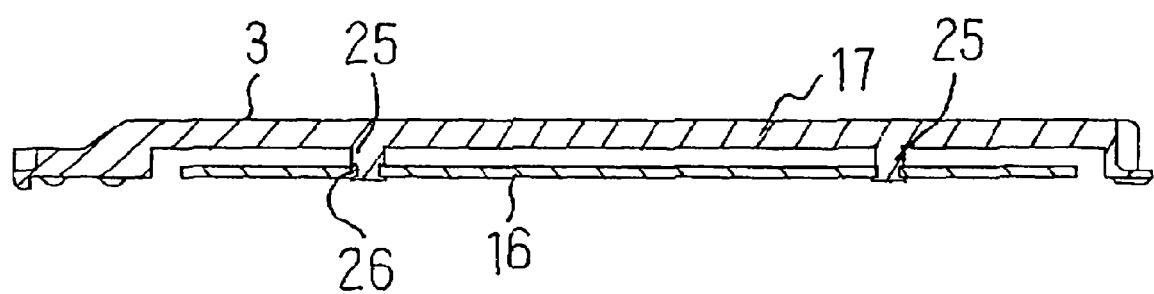
FIG. 6 is a sectional view showing a box cover of a terminal box according to a third embodiment of the present invention.

In the third embodiment shown in FIG. 6, the inner cover and the outer cover of the terminal box described in the first or second embodiment are integrally formed. The other structure is the same as that in the first or second embodiment. Therefore, the same components in this embodiment as those in the first or second embodiment are denoted by the same reference numerals, and the description thereof is herein omitted.

In the terminal box in the third embodiment, the inner cover 16 is fixed onto the back face of the outer cover 17 so as to integrally form the cover. A plurality of dowels 25, each with a step, are integrally formed on the back face of the outer cover 17. The dowels 25 are inserted into small holes 26 formed through the inner cover 16 until the dowels 25 are stopped by their step portions. The tips of the dowels 25 are thermally deformed so as to prevent the dowels 25 from being pulled out from the holes 26. The outer cover 17 and the inner cover 16 are fixed to each other so as to leave a gap owing to the step portions of the dowels 25. With this structure, the terminal box has the box cover 3 that is easy to handle. In addition, the assembly of the box cover 3 is facilitated to result in reduction of fabrication cost. The other functions are the same as those in the first or second embodiment.

According to the present invention, a terminal box used for a solar battery module, in which the thermal deformation is hardly caused by heat generated from the circuit constituting section, with reduction in fabrication cost of the solar battery module and without impairing the mass productivity, can be obtained.

What is claimed is:

1. A terminal box constituting an output section of a solar battery module, comprising:
   a box body housing a circuit constituting section constituted by at least a terminal board and a bypass diode, with an open side opposite to its attachment face, the box body including a portion for housing a charging section of the circuit constituting section and being formed to have a box structure made of a weather-resistant resin, the portion being apart from an outer wall of the box body; and
   a box cover having a double structure of an inner cover made of a metal material and an outer cover made of a weather-resistant resin, the box cover covering the open side of the box structure.

2. The terminal box according to claim 1, wherein the inner cover and the outer cover of the box cover are formed in an integrated structure.

3. The terminal box according to claim 1, wherein the inner cover is formed to have a box structure so as to cover a circumference of an outer surface of the circuit constituting section.

4. The terminal box according to claim 3, wherein a fitting structure is provided for the inner cover so as to be fitted into an inner structure of the box body so that the fitting structure prevents the inner cover from moving with respect to the box body.

5. The terminal box according to claim 1, wherein the inner cover is formed to have a flat plate structure covering an outer surface of the circuit constituting section.

6. The terminal box according to claim 1, wherein a gap is provided between the inner cover and the outer cover.

7. The terminal box according to claim 1, wherein the portion for housing the charging section of the circuit constituting section is filled with a filler, and the inner cover is brought into close contact with the filler.

8. The terminal box according to claim 7, wherein the filler is a highly fire-resistant material.

9. The terminal box according to claim 1, wherein the inner cover is made of a stainless material or a steel plate.

* * * * *